United States Patent [19]

Alferness et al.

[11] Patent Number: 5,701,316
[45] Date of Patent: Dec. 23, 1997

[54] METHOD FOR GENERATING AN INTERNET PROTOCOL SUITE CHECKSUM IN A SINGLE MACRO INSTRUCTION

[75] Inventors: Merwin H. Alferness, New Brighton; Peter Bradley Criswell, Bethel; David Randal Johnson, Oakdale; James R. McBreen, Shoreview, all of Minn.

[73] Assignee: Unisys Corporation, Blue Bell, Pa.

[21] Appl. No.: 521,695

[22] Filed: Aug. 31, 1995

[51] Int. Cl.$^6$ .................................................. G06F 11/10
[52] U.S. Cl. .................... 371/53; 371/54; 395/571; 395/595; 395/568; 395/401
[58] Field of Search .................... 371/53, 54, 37.6, 371/37.7, 48, 37.1; 395/800, 571, 595, 568, 401, 183.06, 183.11, 183.08

[56] References Cited

U.S. PATENT DOCUMENTS

| | | | |
|---|---|---|---|
| 4,142,243 | 2/1979 | Bishop et al. | 364/900 |
| 4,173,041 | 10/1979 | Dvorak et al. | 364/200 |
| 4,377,862 | 3/1983 | Koford et al. | 371/32 |
| 4,481,574 | 11/1984 | DeFino et al. | 364/200 |
| 4,592,005 | 5/1986 | Kregness | 364/736 |
| 5,247,524 | 9/1993 | Callon | 371/53 |

OTHER PUBLICATIONS

R. Braden, "Computing the Internet Checksum," Sep. 1988.
T. Socolofsky, "A TCP/IP Tutorial," Jan. 1991.
P. Steenkiste, "A Systematic Approach . . . " Computer Magazine, Mar. 1994, pp. 47–57.
D. Clark, et al., "An Analysis of TCP Processing Overhead," IEEE Magazine, Jun. 1989, pp. 23–29.

Primary Examiner—Phung Chung
Attorney, Agent, or Firm—Charles A. Johnson; Mark T. Starr

[57] ABSTRACT

An Internet checksum for use by TCP/IP is generated in a single macro-instruction called a Block Add Octets instruction. Extraneous overhead of macro-instruction looping and bit masking is eliminated by combining checksum operations into a single macro-instruction using a block add approach. The programmer specifies the address in memory and the number of double-words of message data to be added together within a single instance of the Block Add Octets instruction so that looping and jump/branch instructions are not needed. The Block Add Octets instruction fetches all octets (8-bit data segments) contained in full double words from memory and adds them into the checksum. The method handles partial double words of data, full double words, and odd numbers of double words, whereby a double word consists of four octets. The checksum is calculated using one's complement arithmetic rather than two's complement, thereby increasing the speed of checksum calculation because the "end around carry" is eliminated. The number of octets that can be added to the checksum per processor cycle is greatly increased, thereby significantly improving overall TCP/IP performance.

21 Claims, 12 Drawing Sheets

| 0 | 1 | 8 | 9 | 10 | 17 | 18 | 19 | 26 | 27 | 28 | 35 |
|---|---|---|---|---|---|---|---|---|---|---|---|
| RES | OCTET I | | RES | OCTET I+1 | | RES | OCTET I+2 | | RES | OCTET I+3 | |

FIG. 5

METHOD FOR GENERATING AN INTERNET PROTOCOL SUITE CHECKSUM IN A SINGLE MACRO INSTRUCTION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention generally relates to computer instructions for error detection checksum generation for data transmissions over a computer network, and more particularly to an improved Transmission Control Protocol/Internet Protocol (TCP/IP) checksum generation method utilizing a single instruction to generate a TCP/IP checksum value.

2. Description of the Prior Art

The widely-known "Internet" utilizes a network architecture defining the protocols, message formats, and other standards for communication between computing devices connected to the network that are not necessarily directly compatible. Where these devices comply with the interact architecture, they can communicate. Included among the protocols of the Internet Protocol Suite (IPS) are the User Datagram Protocol (UDP), the Transmission Control Protocol (TCP) and the Internet Protocol (IP). For more information on UDP, TCP and IP, the reader is directed to the article entitled "A TCP/IP Tutorial", Network Working Group Request For Comments 1180, authored by T. Socolofsky and C. Kale, January 1991. The UDP is an Interact transport protocol that supports best delivery of packets (that is, no retransmission of corrupt or lost packets is performed). The TCP is the primary virtual-circuit transport protocol for the Internet suite. TCP provides reliable, in-sequence delivery of a full-duplex stream of octets (8-bit bytes). TCP is used by those application programs needing reliable, connection-oriented transport services. The TCP provides data flow control to and from network applications, detects and recovers lost or corrupted message packets; and guarantees reliable transmission. The IP allows data packets to be sent and received across networks. When messages are sent from one computing device to another, the message data is passed through various modules, including the TCP and IP modules. The message packet includes message data and various header information. Header information includes several information fields, such as the source port, destination port, the checksum field, and others.

The number of message packets sent across computer networks, especially Local Area Networks (LAN) and the Internet, has greatly increased over the past few years. However, various computer system performance bottlenecks have impeded further progress in expediting data transmissions. One such bottleneck arises in relation to the checksum generation function. One of the most important tasks of any data communications protocol is to deal with transmission errors, and the generation and evaluation of a message data checksum is a common error detection scheme used to detect such transmission errors. A checksum value is typically formed by adding together all data octets within a message to be transmitted over the network. The checksum is then inserted by the sender as part of the header information for the message packet. When the data is received at the message destination, all received data octets are added together by the receiver, and the receiver compares the newly calculated sum against the checksum generated by the sender. If the two sums are equivalent, then no transmission errors are present in the message data just received by the sender. Checksum generation is a large portion of the processing required for passing message data over a network supporting TCP/IP. Computation of the Internet checksum by the sending computer system and by the receiving computer system for every message packet transferred over a computer network incurs undesirable overhead, thereby reducing the overall speed of communications within the network. Hence, minimizing the processing time spent on the checksum generation function (thereby reducing TCP/IP overhead) would have immediate and valuable benefits to users of computer networks utilizing TCP/IP.

An efficient algorithm for generating the Internet checksum by a computer system is critical to good message passing performance in a computer network. One such checksum generation algorithm is documented in the article entitled "Computing the Internet Checksum", Network Working Group Request For Comments 1071, authored by R. Braden, D. Borman, and C. Partridge, September 1988.

The Internet checksum algorithm is as follows. First, adjacent data portions (called octets) to be checksummed are paired to form 16-bit integers, and the one's complement sum of these 16-bit integers is formed. To generate a checksum, the checksum field itself is cleared, the 16-bit one's complement sum is computed over the octets concerned, and the one's complement of this sum is placed in the checksum field. To check a checksum, the one's complement sum is computed over the same set of octets. If the two checksums are equal, the data is presumed to be valid; but if they are unequal, the data is considered to be unreliable.

An "update checksum" instruction was employed by DeFino, et al., in U.S. Pat. No. 4,481,574. DeFino, et al., teaches of a command subroutine calling a manual update checksum instruction. The update instruction then enables a remote service computer to manually change the checksum information to reflect manual program changes in an application program. From the brief description in DeFino et al., the "update checksum" instruction apparently provides an enabling signal that allows manual manipulation of the checksum value in response to manual programming changes. The update checksum instruction by DeFino et al. apparently only enables a modified checksum value to be entered, but the checksum itself is not automatically generated by the update checksum instruction.

Many types of checksum generators implemented in computer hardware exist to form a checksum value. One such checksum generator is disclosed by Bishop et al. in U.S. Pat. No. 4,142,243. Storing a checksum value as a field in a packet is also known in the art, as is shown by Koford et al. in U.S. Pat. No. 4,377,862. However, wherever checksum generation is to be initiated via microcode instructions, there is a significant need for a system and method for reducing TCP/IP processing overhead relating to handling of the checksum. It is highly desirable to perform the checksum generation by execution of a single macroinstruction. Advantages of such a technique would include increased programming simplicity and an elimination of processing cycles required to handle multiple looping instructions inherent in a checksum computation operation. A block mode operation for checksum generation would also be valuable, since it would allow for hardware pipelining, consequently reducing the cumulative time required to generate the checksum value. Therefore, a need exists for a single checksum macroinstruction that takes advantage of the benefits of block mode operation and reduces TCP/IP overhead for message data transfers.

The present invention overcomes the disadvantages of the prior art and improves system processing performance for computer systems sending message data over computer networks supporting TCP/IP.

SUMMARY OF THE INVENTION

An object of the present invention is to reduce the processing overhead for providing TCP/IP capabilities for a computer system connected to a computer network.

Another object of this invention is to perform Internet checksum generation in a single instruction for message data sent by a computer system over a computer network supporting TCP/IP, thereby reducing message data processing fine.

Yet another object of this invention is to eliminate the need for using multiple instructions and a programming loop to calculate an Internet checksum value for message data being sent by a computer system over a computer network utilizing TCP/IP.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended Claims.

The present invention reduces Internet checksum generation overhead by utilizing a single instruction to perform the checksum operation, rather than looping through a macrocode routine. A block mode operation, which allows for hardware pipelining, is used to further reduce processing time. The present invention also allows specified bits of data to be masked, if desired, prior to checksum generation. The masking may or may not be necessary, depending on the architecture of the computer system being used. In the preferred embodiment of the invention, the data format of the machine architecture consists of 36-bit words, rather than words having a size which is an integral multiple of eight bits. Therefore, to convert the 36-bit format to a word format having a multiple of eight bit octets, 4 unused bits are masked to produce a 32-bit word. For purposes of this application, a "word" is defined as a 32-bit data segment, and a double-word is defined as a 64-bit data segment (unless otherwise stated). The unused 4 bits must be programmed to be "don't care" bits, since the binary data comprising these bits will be ignored.

The novel and nonobvious instruction used to perform the checksum generation operation is the Block Add Octets (BAO) instruction. The extraneous overhead of macroinstruction looping (and bit masking, if necessary) is eliminated by combining the operations into a single macroinstruction, and using a block mode rather than a looping mode. The programmer specifies the number of double-words to be added together within a single instance of the macroinstruction, so looping and jump/branch instructions are not required. Data within the block are added continuously until the end of the block is reached. The number of 8-bit data segments (called "octets") that can be added per processor cycle is greatly increased using such a "block add" instruction.

The checksum is calculated using native one's complement arithmetic rather than two's complement. This attribute greatly increases the speed of the checksum calculation. This is because two's complement arithmetic requires half of the arithmetic data register (hereinafter referred to as the "accumulator") to be used to store the overflow from the two's complement arithmetic. Therefore, only half of the accumulator can be used to hold each addend. A costly alternative would be to use the whole accumulator but check for overflow after each addition. On a two's complement machine, the one's complement sum must be computed by means of an "end around carry", i.e., any overflows from the most significant bits are added into the least significant bits. The architecture of the preferred embodiment of the present invention is a native one's complement, so the entire accumulator can be utilized and the addends can be twice as long. Thus, the checksum calculation can be performed in much less time.

According to the present invention, the foregoing and other objects and advantages are attained by a method of generating an Internet Protocol Suite checksum for use by applications supporting TCP/IP, comprising the steps of fetching a checksum generation macroinstruction called a Block Acid Octets instruction from a memory in a computer system, decoding the instruction to determine where the message data to be checksummed is stored in memory, fetching the size of the message data, and executing the Block Add Octets instruction to produce the checksum.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

BRIEF DESCRIPTION OF THE DRAWINGS

FIG. 5 is a diagram showing the format of a data word in the preferred embodiment of the present invention.

DETAILED DESCRIPTION OF THE PREFERRED EMBODIMENT

Figure 1:
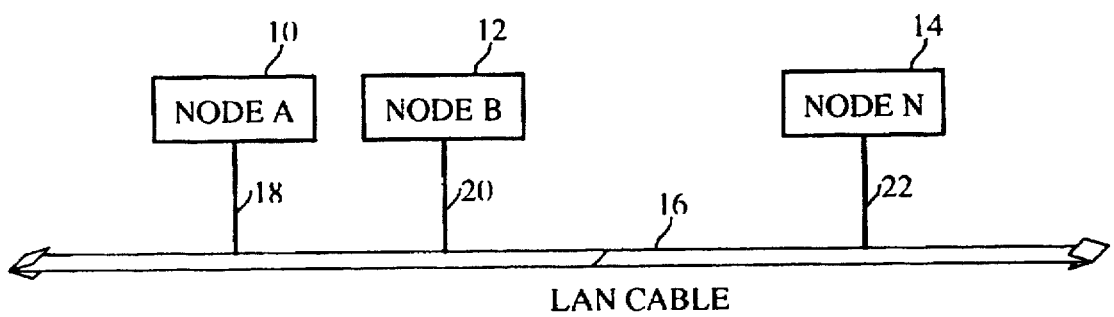
FIG. 1 is a prior art block diagram showing the connection of multiple nodes to a common network cable.

FIG. 1 is a prior art block diagram showing the connection of multiple nodes to a common network cable. In FIG. 1, Node A 10, Node B 12, through Node N 14 are coupled to the Local Area Network (LAN) Cable 16 via Line 18, Line 20 and Line 22 respectively. Using such a network, these nodes (i.e., computer systems) can intercommunicate if sufficient communications protocols are maintained.

Figure 2:
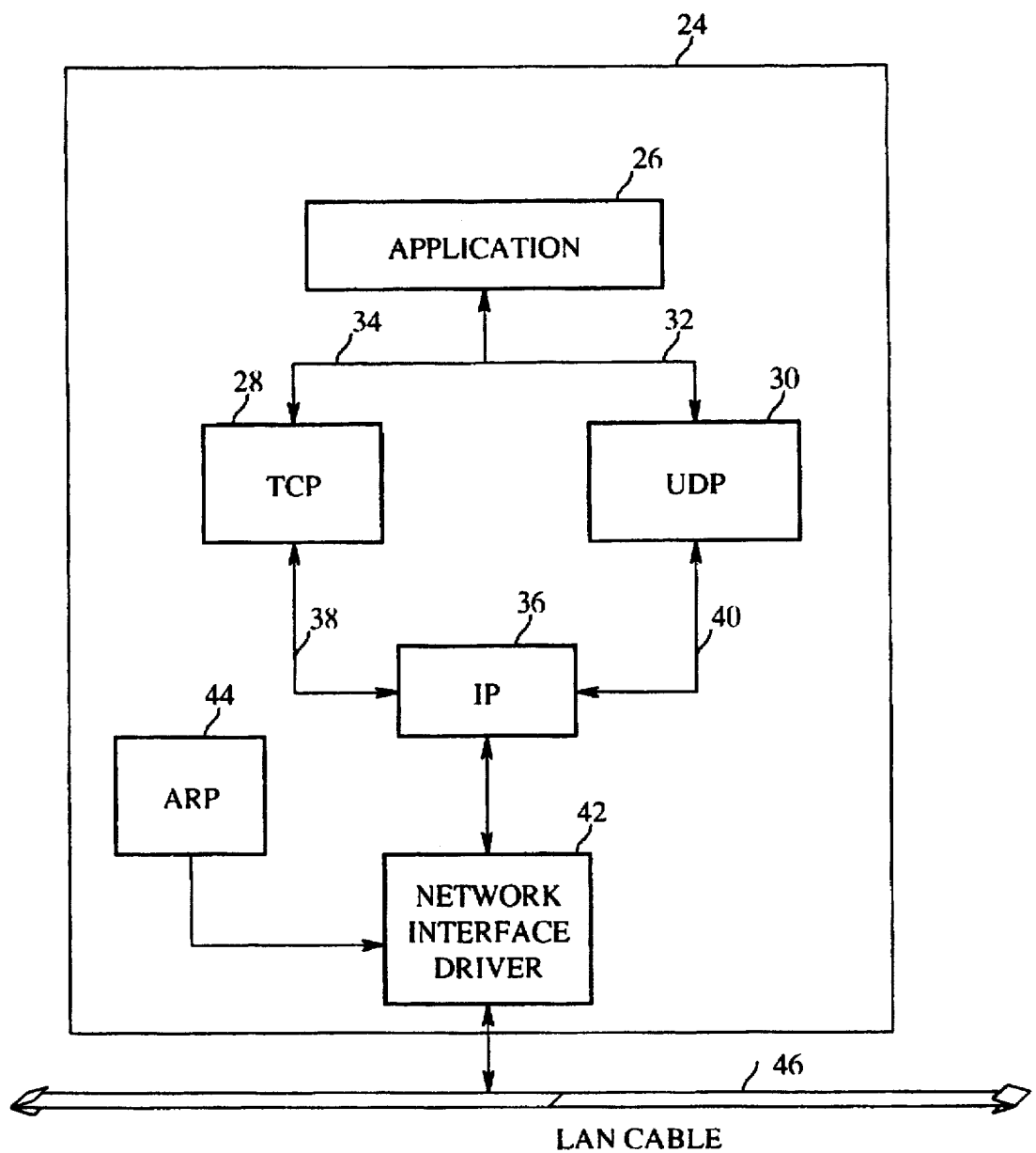
FIG. 2 is a prior art block diagram displaying a typical architecture for a computer system connected as a node on a network.

FIG. 2 is a prior art block diagram displaying a typical architecture for a computer system connected as a node to a network. Each block represents a data processing stage of the Computer System 24, and the connecting lines show the data paths. The Application module 26 represents an application program that uses Transmission Control Protocol (TCP) 28 or User Datagram Protocol (UDP) 30 to send and receive data over the network. The Application module consists of instructions executed by Computer System 24. Whether TCP or UDP is used depends an the requirements of the application. For applications that use UDP to send data, data is passed from the Application module 26 to the UDP module 30 via Line 32. For applications that use TCP to send data, data is passed from the Application module 26 to the TCP module 28 via Line 34. The TCP module 28 and the UDP module 30 consist of instructions executed by the Computer System 24. The TCP module 28 and UDP module 30 are n-to-1 multiplexers (where data is flowing from the Application module 26), and 1-to-n demultiplexers (where data is flowing to the Application module 26). The TCP and UDP modules add their respective header information so the data packet can be demultiplexed at the destination computer system. When receiving data, the TCP and UDP modules strip the header information from the data packet and forward the data to the Application 26.

Data passing from the Application module 26 to the TCP module 28 or UDP module 30 is sent to the Internet Protocol (IP) module 36 for further processing, by way of Lines 38 and 40 respectively. The IP module 36 adds its header information to the data packet to control the routing of the clam packet by the network. The data passes from the IP module 36 to the Network Interface Driver 42. The Address Resolution Protocol (ARP) module 44 is used to convert the IP address information from the IP module 36 into a network media address, to be passed along the network media to the destination computer system. The ARP module 44 is necessary because the IP address and the network media address are selected independently of the Application 26 executing on the computer systems connected to the network. The Network Interface Driver 42 then outputs the network media address onto the network media, e.g., Ethernet, shown in FIG. 2 as the LAN Cable 46. A destination computer system (not shown) is found using the network media address, and the data is passed through the modules of the destination computer system until it reaches the destination Application module (not shown). The process described above for the sending system is executed in the reverse order by the receiving system.

To maintain data integrity while the data is being passed from one node to another, various error detection schemes are used. For the Internet Protocol Suite, error detection is primarily accomplished by calculating a checksum on the data, and including the checksum value in the header information of the data packet. The destination computer system calculates its own destination checksum value from the data received from the network, and compares it to the source checksum value provided in the header. If the two checksums are equal, the data is presumed to be valid; but if they are unequal, the data is considered to be unreliable. Checksums are generated at the IP module 36, the TCP module 28, and optionally at the UDP module 30. Since multiple modules generate checksums both at the source and destination computer systems, it is clear that a significant portion of processing overhead is due to checksum generation and analysis.

Figure 3:
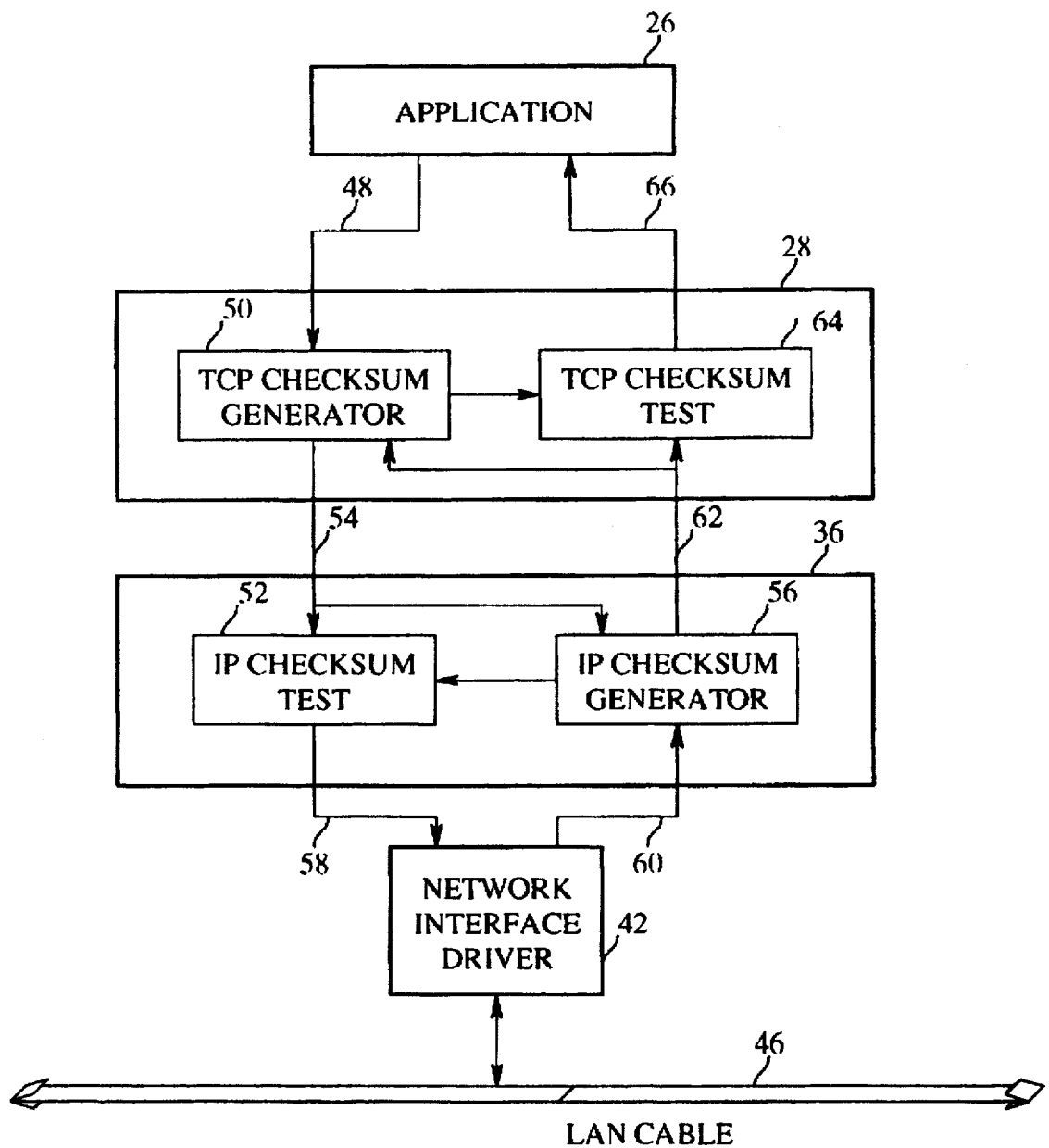
FIG. 3 is a prior art diagram showing the checksum modules within the TCP and IP modules.

FIG. 3 is a prior art diagram showing the checksum modules within the TCP 28 and IP 36 modules. One of the functions performed by the TCP 28 and IP 36 modules is checksum generation and analysis. Data is sent from the Application module 26 to the TCP module 28 by way of Line 48 to the TCP Checksum Generator 50. A TCP checksum value is generated by the TCP Checksum Generator and sent as part of the TCP Header (discussed below) to the IP module 36 via Line 54. The IP Checksum Generator 56 generates a new checksum value (called the IP checksum value) for the data. The TCP checksum and the IP checksum are both stored in the data packet.

A data packet received from the LAN Cable 46 is muted to the destination computer system having the address specified in the header information. The data packet enters the Network Interface Driver 42, and is routed to the IP Checksum Generator 56 over Line 60. A new IP checksum value is generated for the incoming data, and compared with the received IP checksum value. The TCP Checksum Test 64 receives the TCP checksum value, while the TCP Checksum Generator 50 generates a new TCP checksum value for the received data. The TCP checksum values are then compared by TCP Checksum Test 64. If the checksum values match, the data packet is sent to the Application 26 via Line 66.

Figure 4:
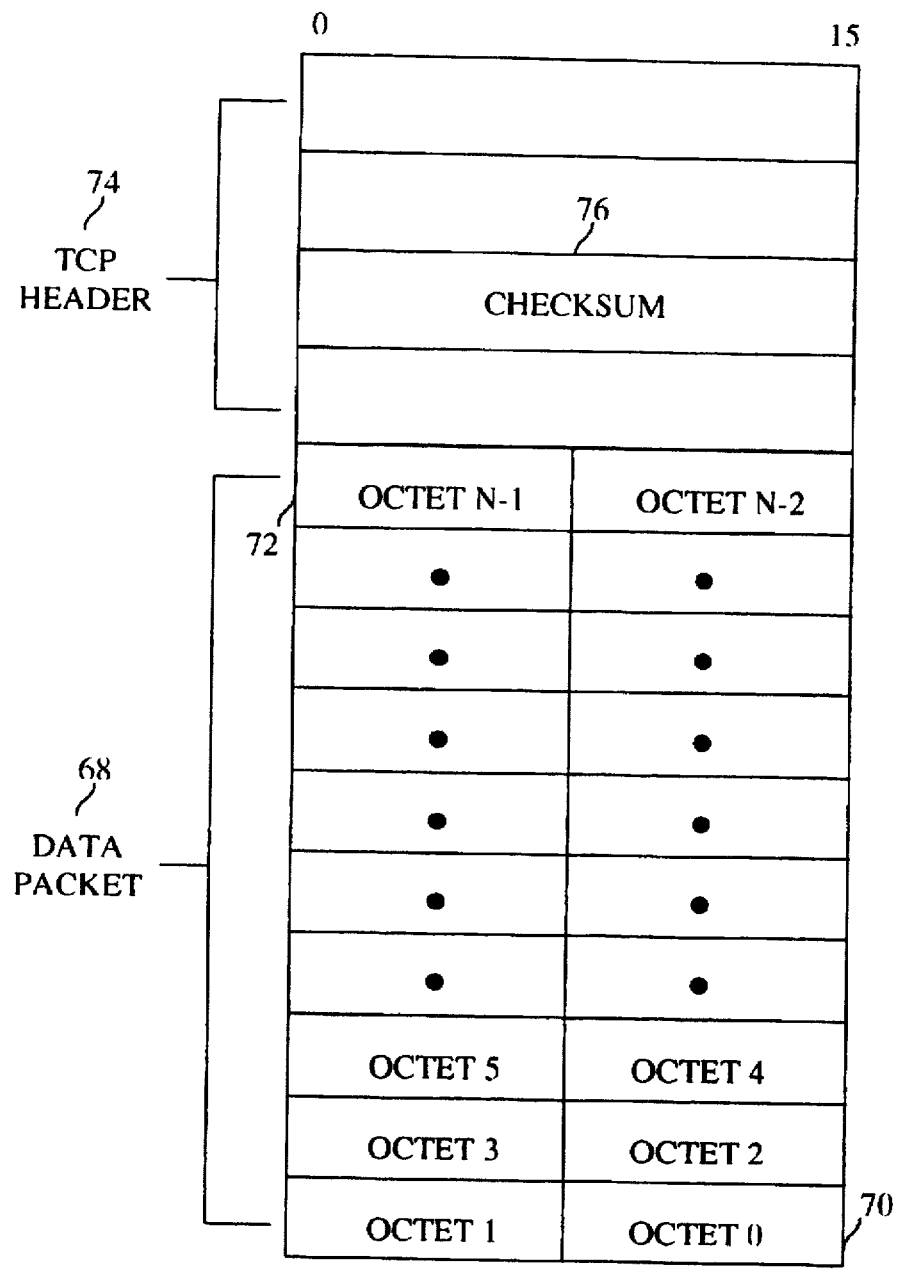
FIG. 4 is a prior art diagram showing a format of an Internet message.

FIG. 4 is a prior art diagram showing a format of an Internet message. The Data Packet 68 consists of a series of 8-bit octets, beginning with Octet 0 70 and ending with Octet N-1 72. The TCP Header 74 carries a variety of information and control fields. Among these fields are the source and destination port fields (not shown) and the Checksum Field 76. The Checksum Field 76 provides a fixed location for holding the checksum value calculated over the octets. For checksum generation, each data octet pair is added to the next octet pair in the data packet. When the summation is complete, the resulting checksum value is stored in the Checksum Field 76 of the TCP Header 74. In the preferred embodiment of the present invention, the Block Add Octet (BAO) instruction is used to reduce the checksum result to 8 octets in one double-word. Other instructions are used to reduce the 8 octets to a single 16-bit value stored in a register. This register's contents are then moved into the Checksum Field of the TCP (or UDP or IP) Header.

FIG. 5 is a diagram showing the format of a data word in the preferred embodiment of the present invention. This data word format is used in the 2200 Series computer system, commercially available from Unisys Corporation. Communications data is stored in a series of 8-bit octets which are stored in computer memory in the format shown in FIG. 5. The data format of the preferred embodiment is a 36-bit word size. Therefore, in order to be compatible with existing TCP/IP protocols, only 32 bits of the 36-bit word is used for storing data. FIG. 5 shows the portion of the 36-bit word which stores the 32 bits of data. The manner in which this conversion is accomplished is described in more detail below. Note that Bits 0, 9, 18, and 27 are Reserved (RES). These Bits are not used for storing data in the preferred embodiment.

Figure 6:
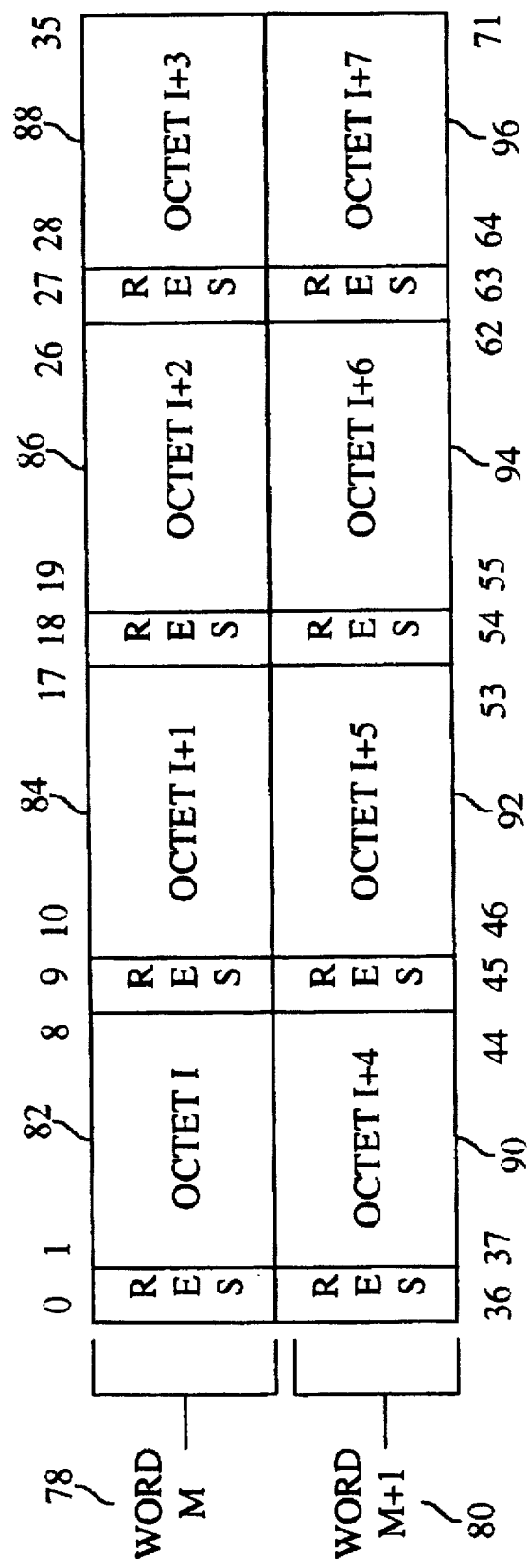
FIG. 6 is a diagram showing the format of a double-word of data upon which the Internet checksum is calculated.

FIG. 6 is a diagram showing the format of a double-word of data upon which the Internet checksum is calculated. A double-word in the prior art is typically a 64-bit data segment, but in the preferred embodiment, a double word is a 72-bit data segment having eight bits masked out. One or more double-words are contained in a data packet sent or received via the network. All double-words of the data packet are added together to form the checksum. The data packet is stored in computer memory at a specified starting address. Word M 78 consists of 36 bits (bits 0–35) and Word M+1 80 also has 36 bits (bits 36–71). Word M 78 consists of four "octets" (8-bit data segments), labeled Octet I 82, Octet I+1 84, Octet I+2 86 and Octet I+3 88. Word M+1 80 consists of four octets labeled Octet I+4 90, Octet I+5 92, Octet I+6 94 and Octet I+7 96. Both Word M 78 and Word M+1 80 have four "reserved" bits (RES) indicating which bits are masked off of the 36-bit words to produce the requisite 32-bit words. Word M 78 and Word M+1 80 together produce the 72-bit double-word, which after masking contains 64 bits of data. Although the data format of the preferred embodiment is a 36-bit word used to store 32 bits of data, the present invention applies to data formats consisting of multiples of eight bits as well. The masking procedure is required only for systems having data formats which are not multiples of eight bits.

Figure 7:
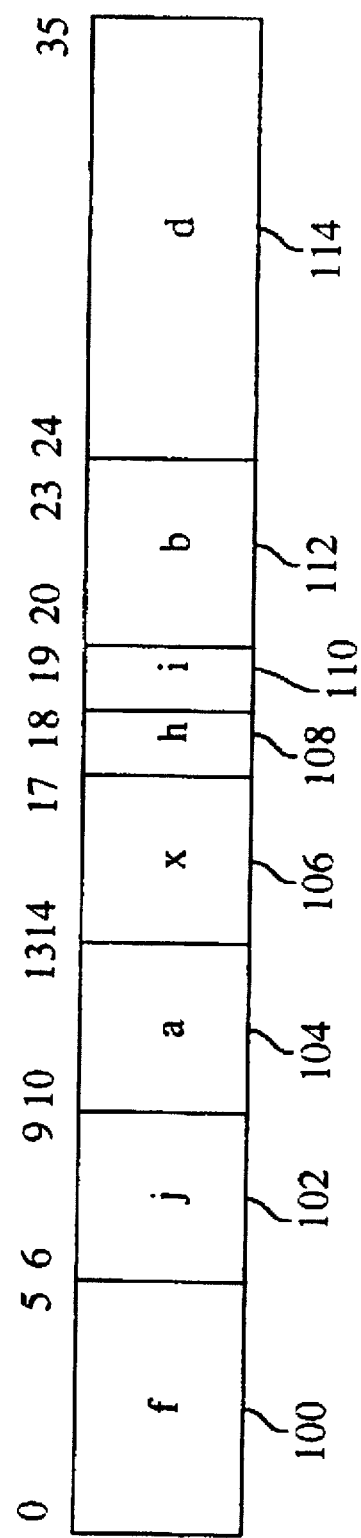
FIG. 7 is a diagram of the instruction format of the Block Acid Octet (BAO) instruction.

In the preferred embodiment of the present invention, the Internet checksum is calculated for a data packet by executing one special-purpose macroinstruction (except where octets are outside of a double word boundary). FIG. 7 is a diagram of the instruction format of the Block Add Octet (BAO) instruction. In the preferred embodiment, the BAO instruction is designed to operate as part of the instruction set architecture of the 2200 Series computer system, although a similar instruction could be included in the instruction sets of other computer systems. All instructions in this system architecture consist of 36-bit words. The instruction fields identify the function code and the registers and/or the storage words which are to be operated on by the processor. It should be recognized by those skilled in the art that a 36-bit word format is not required for the present invention, and that other word sizes may be used in the manner discussed below.

The "f" Field 100 specifies the Function Code for the instruction. The Function Code indicates the operation to be performed by the instruction. The "f" Field 100 is located at bits 0–5. In the preferred embodiment of the BAO instruction, the value of the Function Code in the "f" Field 100 is 72 (decimal). For the BAO instruction, an Extended Function Code is entered into the "j" Field 102. The "j" Field is used in conjunction with the "f" Field 100 to generate an Extended Function Code, thereby extending the range of valid operation codes in the system. The "j" Field 102 is represented by bits 6–9. In the preferred embodiment of the BAO instruction, the Extended Function Code has a value of 13 (decimal). Bits 10–13 of the BAO instruction comprise the "a" Field 104, which represents an Arithmetic Register for use as a register operand.

The "x" Field 106, "h" Field 108, "i" Field 110, "b" Field 112, and "d" Field 114 are used to form the instruction operand address. The "b" Field 112 specifies a base address in computer memory that points to a memory bank containing the instruction operand. To obtain the desired instruction operand address, an offset to the memory bank is required. This offset is known as "U". The U offset is derived by combining a displacement address and an index value. The displacement address is specified by the "d" Field 114, which contains a displacement value to provide an offset from the address origin of the memory bank. The "x" Field 108, when non-zero, specifies an index register which holds an index value to be added to the displacement value of the "d" Field 114 to complete the offset "U". The "x" Field 106 in the preferred embodiment is a combination of an "$x_m$," and "$x_i$". The "$x_m$" value is the actual index value, and the "$x_i$" value is an increment value. If the index incrementation designator in the "h" Field 108 is set, the "$x_i$" value will be added on every iteration to the "$x_m$" value, to determine the total index value to be added to the displacement value in the "d" Field 114, thereby forming the total offset value "U". An increment is used in the preferred embodiment, so the index incrementation designator in the "h" Field 108 is set, and "$x_i$" will be added to "$x_m$" to form the index value in the "x" Field 106. The value of "$x_i$" in the preferred embodiment is 2, because addition of double-words (72 bits) will take place in the checksum generation. The indirect addressing designator in the "i" Field 110 indicates whether the "U" offset is an 18-bit or a 24-bit value.

Figure 8:
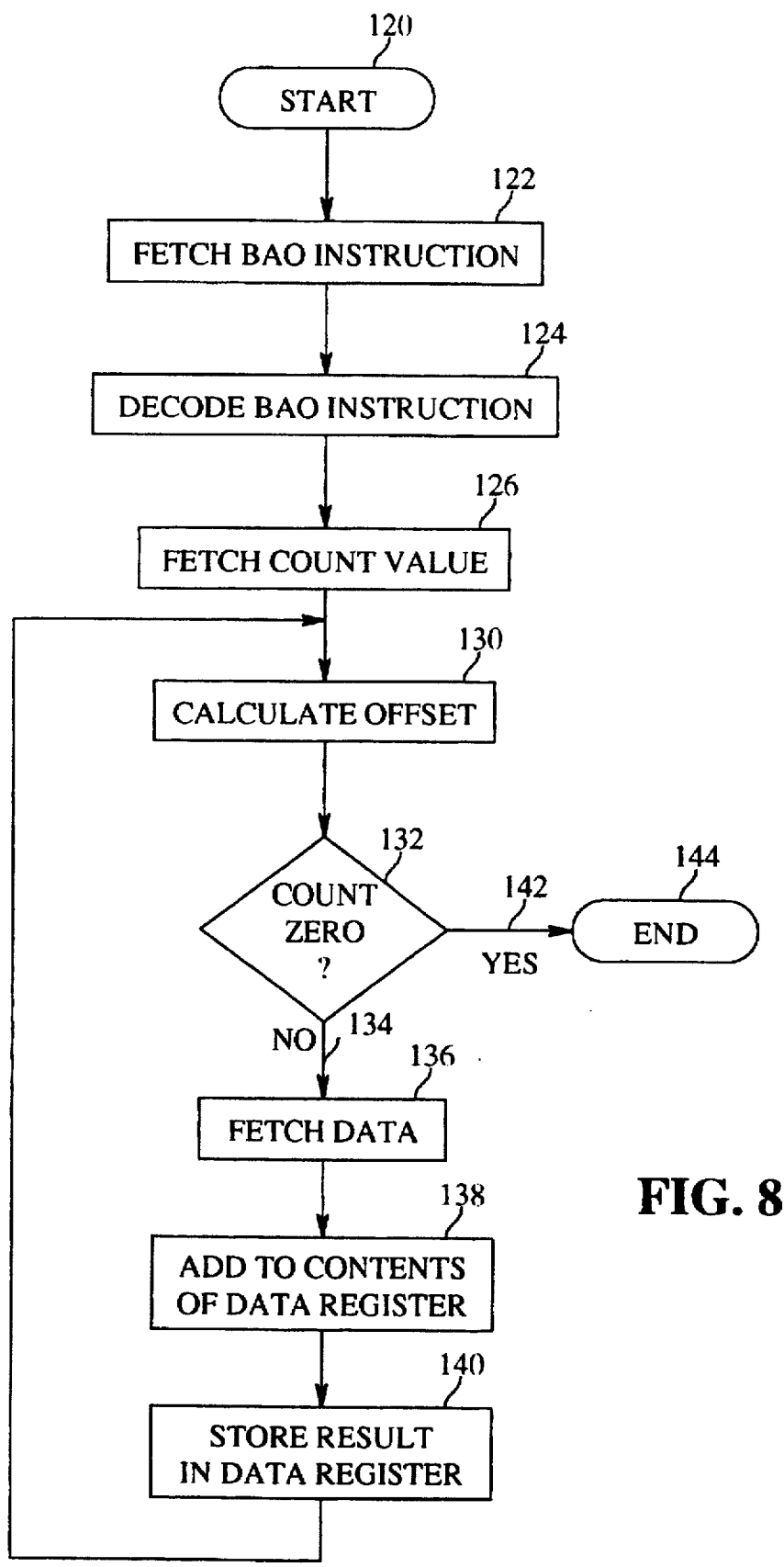
FIG. 8 is a flow diagram describing the processing steps for determining the Internet checksum according to the present invention.

FIG. 8 is a flow diagram describing the processing steps for determining the Internet checksum according to the present invention. The process begins following Start Step 120 at Step 122 where the Block Add Octets (BAO) instruction is fetched from instruction memory. The instruction is decoded at Step 124 to determine that the instruction is the BAO instruction. At Step 126, a count value is fetched from the Repeat Count Register (General Purpose Register R1). The count value indicates the number of double-words that are to be added together to form the Internet checksum for the data in the packet. Processing continues at Step 130, where an offset to a predetermined base address in memory is calculated to indicate the starting point of the double-words of data. The base address "b" and the offset value "U" are provided as part of the BAO instruction. In the present invention, Steps 122 through 126 are taken only once during execution of the checksum generation function. This is a significant advantage over previous looping techniques because the loop has been eliminated without the need for techniques such as instruction combining.

After the offset has been determined, the count value is checked at Test Step 132. When the count has not been decremented to zero, there are more double words to process. Thus, No path 134 is taken and processing continues at Step 136. At Step 136 a new double-word of data is fetched from the block of memory where the Internet data packet is stored. Processing continues to Step 138. For the first iteration, the double-word of data is added (using one's complement arithmetic) to the pre-existing contents of a data register. For subsequent iterations, the double word is added to the previously processed double words of data. The result is stored in the data register as shown in Step 140 and the count is decremented. When the result has been stored at Step 140, the count value is again checked at Test Step 132. Looping continues throughout the block of data comprising the Internet data packet until the count value decrements to zero, at which time Yes path 142 is taken and processing terminates at Stop Step 144. It can be seen that only one macroinstruction is fetched (the BAO instruction at Step 122), thereby reducing checksum generation overhead by eliminating additional instruction fetching and decoding operations. Furthermore, the use of a single macroinstruction performing such a "block mode" operation allows for hardware pipelining without special loop-elimination techniques such as instruction combining.

Figure 9:
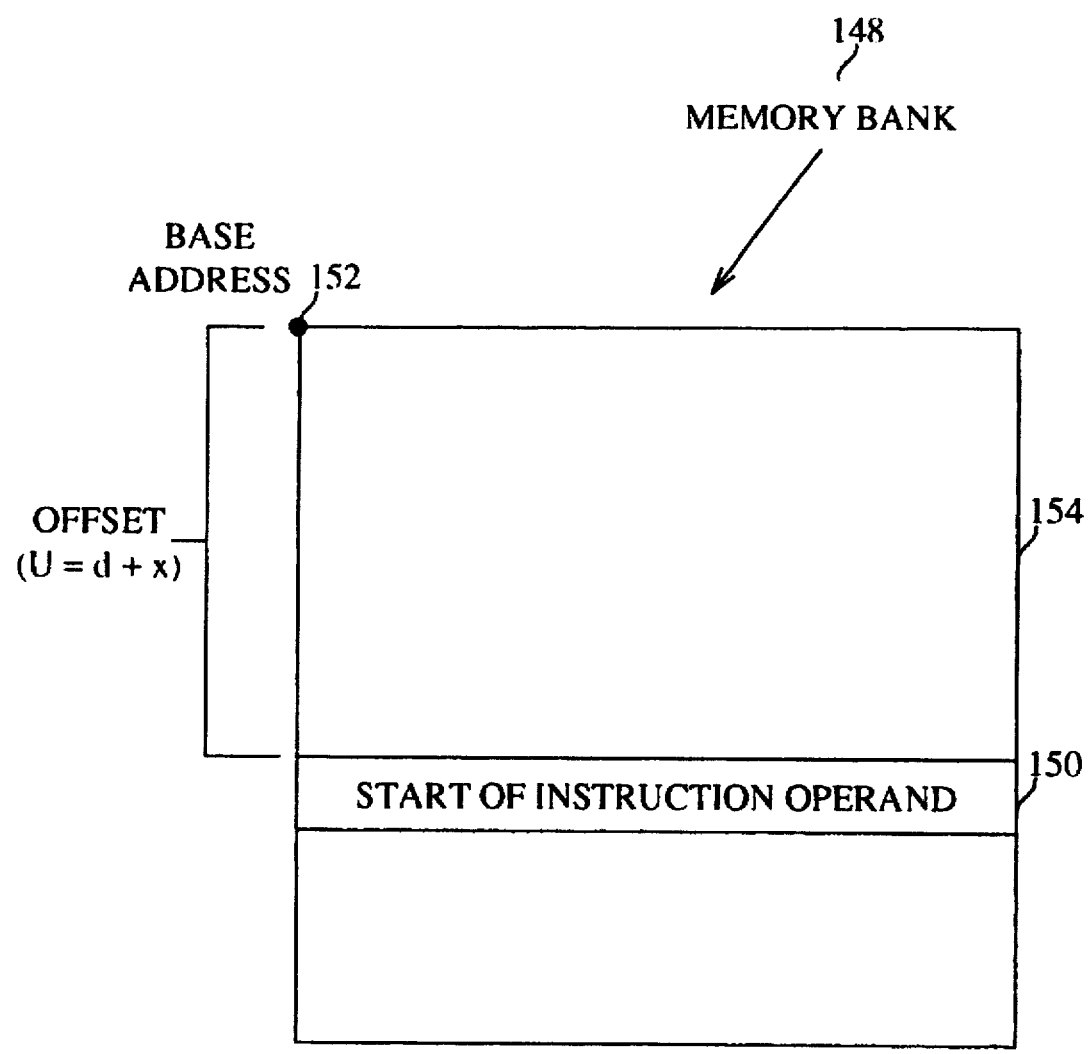
FIG. 9 is a diagram of a Memory Bank where a BAO instruction operand is stored.

FIG. 9 is a diagram of a Memory Bank where an instruction operand is stored. FIG. 9 shows how the fields of the BAO instruction of FIG. 7 are used to access the selected instruction operand. The data comprising an Internet message is stored in a memory area that is a subset of a Memory Bank 148 in the computer system's memory. This data can be seen as the Instruction Operand 150. The base address of Memory Bank 148 is represented by the "b" Field 112 of FIG. 7, and is shown as the Base Address 152 in FIG. 9. The address of the Instruction Operand 150 can be determined by adding the Offset 154 to the Base Address 152. As described above in the description of FIG. 7, the Offset 154 is the sum of the displacement address represented by the "d" Field 114 and the index value obtained from an index register represented by the "x" Field 106.

In the preferred embodiment of the present invention, the BAO instruction is executed only on data segments having double-word boundaries. Adding double-words results in a faster checksum calculation than if smaller data segments (such as single octets) were added. A 64-bit data segment is generally referred to as a double-word. However, in the preferred embodiment of the invention, the native word size of the computer system is 36 bits rather than 32 bits, and therefore the double-word size is 72 bits in length. This double-word size is driven by the specific architecture utilized, but the following discussion is applicable to any word size which may be used in a computer system. Because the Internet checksum standard requires a 16-bit final checksum value, the word size must be converted in a multiple of eight, so that a 16-bit checksum value can be realized. Therefore, the 36-bit word in the preferred embodiment is converted to a 32-bit size by way of a masking process, whereby 4 "don't care" bits of each 36-bit word are masked out. This results in a 32-bit word, or a 64-bit double-word, in which the 16-bit data segments can be added to each other to produce a 16-bit Internet checksum value.

As discussed immediately above, the BAO instruction of the preferred embodiment is executed only on double-word boundaries. Therefore, if the data comprising the instruction operand does not begin and end on a double-word boundary, those data octets not falling within double-word boundaries must be added separately to the checksum value determined by the BAO instruction. This allows the BAO instruction to perform its checksum operation only on data of a double-word length, thereby increasing the speed of the checksum generation operation. The double-word checksum resulting from execution of the BAO instruction must then be converted to a 16-bit checksum value, to conform to Internet standards. This is accomplished by adding each of the 16-bit data segments of the resulting double-word together to form a single 16-bit checksum result. This process will become clearer by an analysis of FIGS. 10 and 11.

Figure 10:
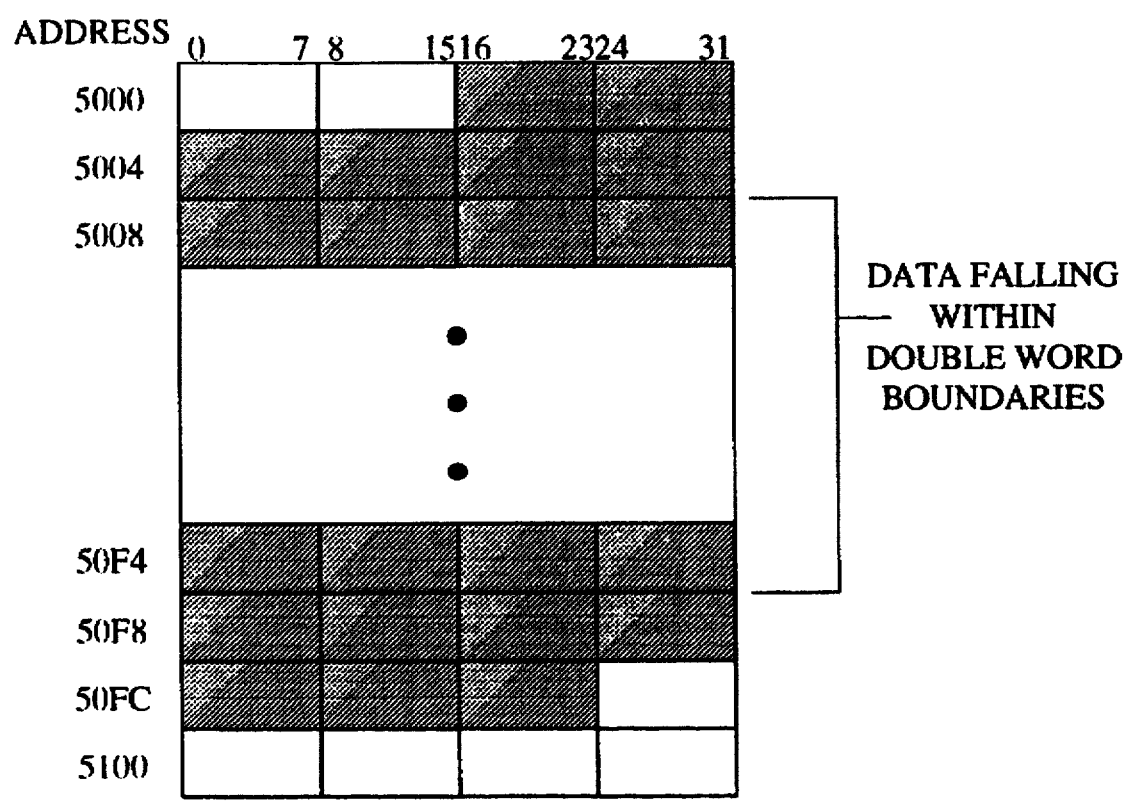
FIG. 10 is a block diagram of the instruction operand, wherein data to be checksummed falls outside of the double-word boundaries.

FIG. 10 is a block diagram of the instruction operand, wherein data to be checksummed falls outside of the double-word boundaries. FIG. 10 depicts a typical block of memory storing an instruction operand, which for this example arbitrarily starts at hexadecimal address 5002 and extends through hexadecimal address 50FE. The memory byte at addresses 5000 and 5001 do not contain data from the instruction operand, and therefore bytes of the data stored in the double-word at beginning address 5000 must be separately added to the checksum value determined by the BAO instruction. Similarly, the seven octets at addresses 50F8–50FE must be added separately to the checksum value of the BAO instruction, because the instruction operand ends at address 50FE, which is not on a double-word boundary. This example shows all data from address 5008 through address 50F7 as falling within double-word boundaries. This dam will be checksummed by the execution of a single BAO instruction. The data stored in addresses 5002 through 5007, and stored in addresses 50F8 through 50FE, must be added separately to the checksum value generated by the BAO instruction.

Figure 11:
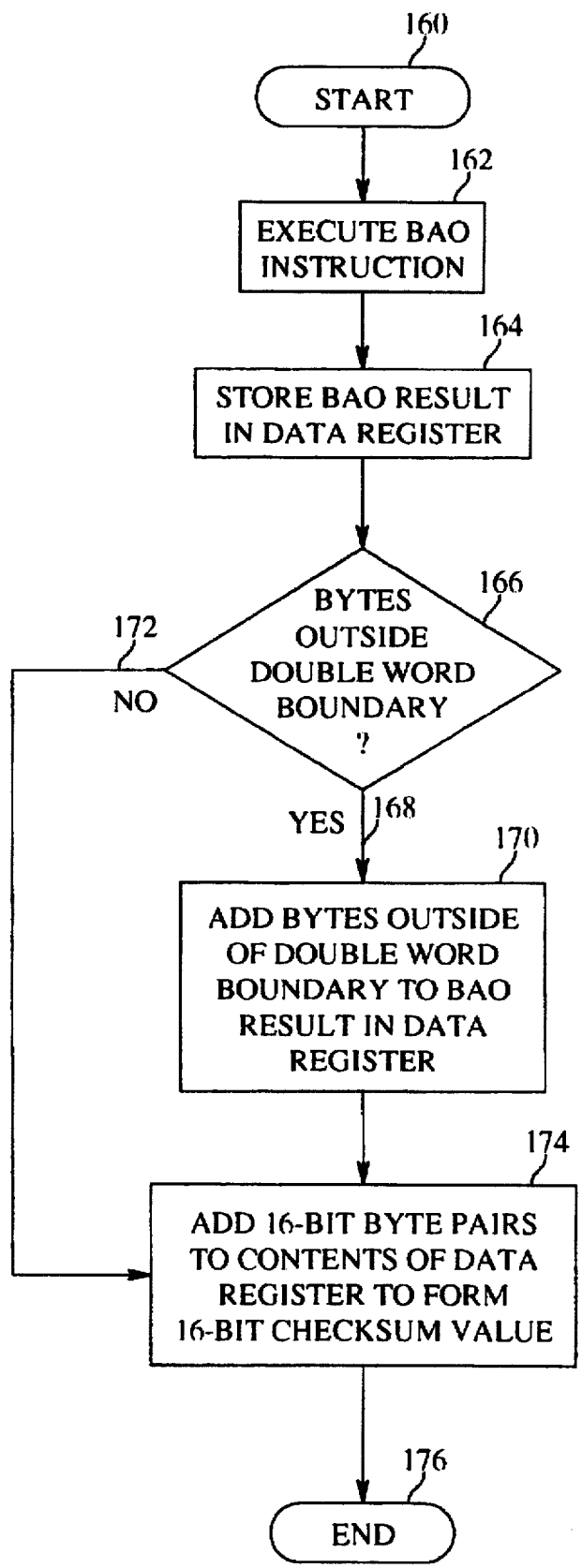
FIG. 11 is a flow diagram illustrating the steps for obtaining the final 16-bit Internet checksum value.

FIG. 11 is a flow diagram illustrating the steps for obtaining the final 16-bit Internet checksum value. After Start Step 160, the BAO instruction is executed at Step 162. At this stage, all full double-words in the instruction operand are checksummed on a double-word basis. This result is stored in a clam register (or other storage register or array), as shown at Step 164. At Test Step 166, the instruction operand is analyzed to determine whether any of its data falls outside of double-word boundaries. If so, the process continues along the Yes path 168 to Step 170, where those octets stored outside of double-word boundaries are added to the results of the BAO instruction execution stored in the data register. It should be noted that Step 170 could be executed prior to execution of the BAO instruction if desired, since the order of the summation is irrelevant. This is due to the commutative and associative mathematical properties of one's complement addition. If none of the instruction operand falls outside of double-word boundaries, processing continues along the No path 172 to Step 174. Step 174 is also reached following Step 170. At Step 174, a 16-bit checksum value conforming to the Internet standards is generated from the contents of the data register. In the preferred embodiment, the double-word is 64 bits in length after eight of the original 72 bits have been masked off. To obtain a 16-bit checksum value from the 64-bit checksum value, the four 16-bit data segments comprising the 64-bit checksum result must be added together. The order of the addition is not important because of the commutative and associative properties of one's complement addition, as long as the even/odd assignment of octets is respected (i.e., of the eight 8-bit octets in a 64-bit double-word, octets 0, 2, 4 and 6 should be added together regardless of the order of the addition, and octets 1, 3, 5 and 7 should be added together regardless of the order the addition). When the 16-bit checksum value is obtained, End Step 176 is reached, and the process is complete.

Figure 12:
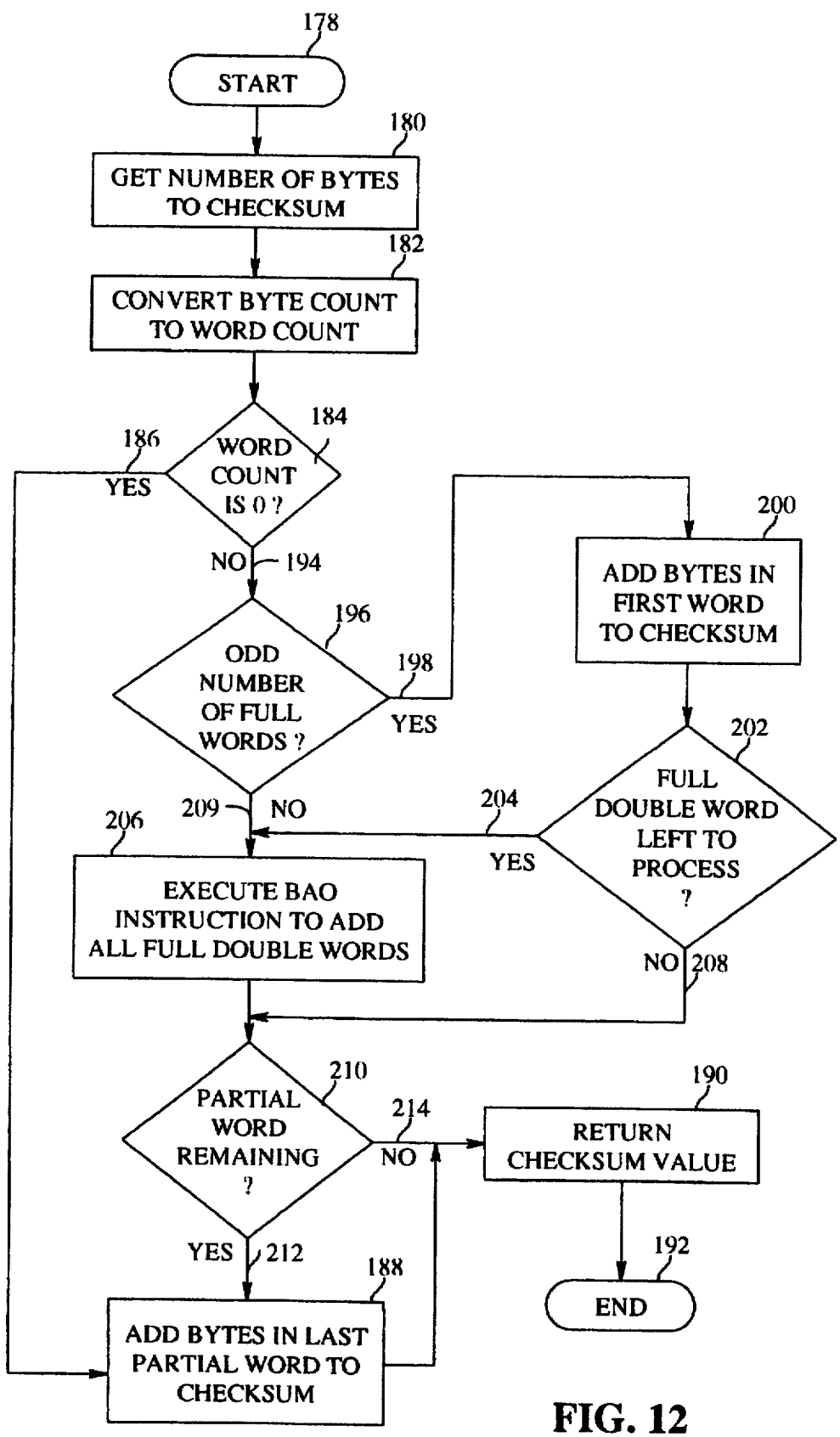
FIG. 12 is a flow chart illustrating the detailed steps for generating the Internet checksum.

FIG. 12 is a flow chart illustrating the detailed steps for generating the Internet checksum. After Start Step 178, the number of octets (octets) of data to be checksummed is obtained. This octet count is converted to a word count at Step 182 to obtain the number of words of data to be checksummed. If, at Test Step 184, the number of words is zero, then Yes path 186 is taken to Step 188. With a word count of zero there could be one, two, or three octets of data to be checksummed, but no full words of data (a full word having all four octets used as part of the message data). Thus, at Step 188 these octets of a last (or only) partial word are added to the checksum value. Step 190 is then performed to return the checksum value to the caller and Internet checksum generation ends at End Step 192. Referring back to Test Step 184, if there are full words of data to be checksummed, No path 194 is taken to Test Step 196. If there are an odd number of full words of data, Yes path 198 is taken to Step 200. At Step 200, the octets of the first word are added to the checksum. There are now an even number of full double words of data yet to be checksummed. If there are full double words left to process (Test Step 202), Yes path 204 is taken to Step 206. If no full double words are left, No path 208 is taken and Step 206 is not processed. If, at Test Step 196, there is not an odd number of full words to process, No path 209 is taken to Step 206.

At Step 206, the Block Add Octets (BAO) instruction is executed to add all octets of the remaining full double words of data to the checksum. No looping through multiple "ADD" instructions for each octet or word in the data is necessary. One skilled in the art can readily see that a significant advantage to the present invention is its capability to "block add" a variable number of double words to the checksum while consuming a fixed amount of processing overhead at the macroinstruction level. At Test Step 210, a check is made to determine if there is an unprocessed partial word remaining for the data to be checksummed. If there is a remaining partial word, Yes path 212 is taken to Step 188 for processing of the last partial word. If there is not a remaining partial word, No path 214 is taken to Step 190. The generation of the checksum is now complete and the checksum value is returned to the requesting program. Processing ends at End Step 192.

Table I shown below illustrates a section of prior art program code which generates the Internet checksum using instructions previously available in the instruction set architecture of the 2200 computer system. Note that masking of the ninth bit in each 9-bit byte is required for implementation on the 2200 computer system, but is not required on other computer systems using an 8-bit byte. Note also that a loop is traversed for each double word of data to be checksummed. This code fragment is shown as an example for comparison with the usage of the present invention. The storage location denoted "9THBITS_MASK" holds the mask value (0400400400400 octal). This sets the ninth bit in each byte, thereby forcing the carry to ripple to the next octet. Note that the message data ninth bits must be zero for the carry to properly ripple. Either the ninth bits are assumed to be zero or the ninth bits must be cleared by the checksum code. The arithmetic registers A4 and A5 are used to hold the partial checksum, register X1 is the index in the message data, and register R1 holds the number of double words of message data minus one.

TABLE I

© 1995 Unisys Corporation

| CHKSUMLOOP | OR | A5, 9THBITS_MASK | . set pseudo carry bits |
|---|---|---|---|

TABLE I-continued

| | OR | A4, 9THBITS_MASK | . set pseudo carry bits |
|---|---|---|---|
| | DA | A5,,*X1 | . add octet to accumulator |
| | OR | A6, 9THBITS_MASK | . mask |
| | OR | A5, 9THBITS_MASK | . mask |
| | DA | A6,,*X1 | . add octet to accumulator |
| | OR | A7, 9THBITS_MASK | . mask |
| | OR | A6, 9THBITS_MASK | . mask |
| | DA | A7,,*X1 | . add octet to accumulator |
| | OR | A8, 9THBITS_MASK | . mask |
| | OR | A9, 9THBITS_MASK | . mask |
| | DA | A8,,*X1 | . add octet to accumulator |
| | DL | A4, A8 | . reposition accumulator |
| | JGD A0, CHKSUMLOOP | | . go back to top of loop |

The loop shown above executes on a typical 2200 computer system in 14 machine cycles per 32 bytes, or 0.44 cycles per byte, ignoring storage delays. One skilled in the art can readily see that when computing checksums in machines that have 8-bit bytes, the "OR" instructions for masking bits are not required. Thus, the performance of the checksum generation loop will be improved, but at least four or five macro instructions must be still executed for each double word of data to be checksummed. As messages grow very large, the time spent in the checksum loop becomes a larger and larger percentage of TCP and UDP processing time. Table II below is a section of program code illustrating the usage of the Block Add Octets (BAO) instruction. The preferred embodiment of the present invention executes at one cycle per eight bytes, or 0.125 cycles per byte, ignoring storage delays. Note the significant improvement over the 0.44 cycles per byte metric for the prior art approach. Parameters used include the number of octets of data to be checksummed and the address in memory where the data begins (on a word boundary).

TABLE II

© 1995 Unisys Corporation

. Initialization and set up

| LBU | B2, R0 | . Base Link Vector Bank |
|---|---|---|
| LITBASE | B11 | . Load base of literals |
| LBU | B3, A1 | . Base and subset PPL |
| L | A0, PARA1,,B3 | . Get number of octets to checksum |
| LBU | B7, PARA2,,B3 | . Base and subset data address |
| L,U | A2, 0 | . Word index for the data |
| LBU | B8, PARA3,,B3 | . Base and subset checksum value |
| L | A4,0,,B8 | . Get previous checksum value |
| L | A3,LIT(0400400400400) | . Mask for ninth bits |
| AND,U | A0, 3 | . A1 =# octets in last partial word |
| SSL | A0, 2 | . Convert octet count to word count |
| JZ | A0, CHKOLAST | . No whole words, do last partial |
| L | A5, A0 | . Get number of words in A5 |
| AND,U | A5, 1 | . A6 : preceding non-double word |
| SSL | A0, 1 | . A0 : double count |
| JZ | A6, CHKODODUB | . Ready to checksum doubles? |

. There are an odd number of full words to checksum. Do the first
. by itself before using BAO instruction

| SZ | A10 | . Clear A10 for the MLU |
|---|---|---|
| L | R2, LIT(0377377377377) | . Mask bits 1–8 for MLUs |
| OR | A3, A4 | . Set pseudo carry bits |
| MLU | A10,, A2,B7 | . Load data with ninth bits cleaned |
| A | A4, A11 | . Add word to accumulator |
| L,U | A2, 1 | . Word index of data |
| JZ | A0, CHKNODUB | . Doubles to checksum? |

TABLE II-continued

| CHKDODUB | | | . Set up to perform BAO instruction |
|---|---|---|---|
| | L,U | A5, 0 | . Clear word 2 of accumulator |
| | LXI,U | A2, 2 | . Set up the incrementer |
| | L | R1, A0 | . Number of doubles for BAO |
| | BAO | A4,,*A2,B7 | . Add all double words |
| | OR | A3, A4 | . Set pseudo carry bits |
| | AND | A5, LIT(0377377377377) | . Clear ninth bits |
| | A | A4, A6 | . Add accumulator halves |
| CHKNODUB | | | . Done with full double words. Only a partial doubleword remains |
| | JZ | A1, CHKOSUMACC | . Partial word remaining? |
| CHKOLAST | | | . Do the last partial word of octets |
| | L | A0,,A2,B7 | . Yes, get partial word |
| | AND | A0, CHECKMASK, A1, B11 | . Mask out leftover |
| | OR | A3, A4 | . Set pseudo carry bits |
| | A | A4, A1 | . Add to checksum |
| CHKOSUMACC | | | . A4 has accumulated checksum |
| | AND | A4, LIT(0377377377377) | . clear ninth bits |
| | S | A5,0,,B8 | . Return checksum value |
| | RTN | | |
| | END | | |

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

We claim:

1. In a computer system for sending packets of message data to and receiving packets of message data from at least one communications network utilizing a Transmission Control Protocol/Internet Protocol (TCP/IP), the computer system having a memory to store the packets of message data, a method of generating an Internet Protocol Suite checksum containing a first predetermined number of binary digits comprising the steps of:

(a) fetching a checksum generation macroinstruction from the memory;

(b) decoding said checksum generation macroinstruction to determine where a selected one of the packets of message data resides in the memory:

(c) fetching the size of said selected one of the packets of message data; and (d) executing said checksum generation macroinstruction to generate the Internet Protocol Suite checksum for said selected one of the packets of message data, including the steps of:

(d1) fetching from a selected register contents for use as a first operand;

(d2) calculating an address in the memory wherein said selected one of the packets of message data resides;

(d3) fetching a second predetermined number of binary digits of said selected one of the packets of message data as a second operand, wherein said second predetermined number of binary digits is greater than the first predetermined number of binary digits;

(d4) adding said second operand to said first operand to form a checksum and storing said checksum as said first operand;

(d5) repeating steps (d3) through (d4) for each said second predetermined number of binary digits included within said selected one of the packets of message data to be checksummed as determined by said size of said selected one of the packets of message data: and (d6) storing said checksum into said selected register.

2. The method of claim 1, wherein said adding step uses one's complement arithmetic.

3. The method of claim 1, wherein said second predetermined number of binary digits of said selected one of the packets of message data includes eight 9-bit octets with one bit of each one of said eight 9-bit octets being unused.

4. The method of claim 1, further including the step:

(e) adding octets of the message data to be checksummed not previously processed as part of one of said second predetermined number of binary digits of said selected one of the packets of message data to said checksum to form a new checksum and storing said new checksum in said register.

5. The method of claim 4, further including the step of (f) adding a least significant 32 bits of said register to a most significant 32 bits of said register to form a 32-bit interim checksum.

6. The method of claim 5, further including the step of (g) adding a least significant 16 bits of said interim checksum to a most significant 16 bits of said interim checksum to form a 16-bit Internet Protocol Suite checksum.

7. The method of claim 1 and further including the steps of adding predetermined ones of the binary digits of said checksum to other predetermined ones of the binary digits of said checksum to obtain a preliminary Internet Protocol Suite checksum; and adding all message data contained within said selected one of the packets of message data which was not added in said adding step to said preliminary Interact Protocol Suite checksum to obtain the Internet Protocol Suite checksum.

8. The method of claim 1 wherein the computer system includes an arithmetic data register for performing said checksum generation macroinstruction, and wherein said arithmetic data register is capable of storing said second predetermined number of binary digits.

9. The method of claim 1 wherein said step of fetching a second predetermined number of binary digits further includes masking predetermined ones of the binary digits contained within said second operand.

10. The method of claim 9 wherein said includes the step generates a plurality of intermediate checksum values, each containing the first predetermined number of binary digits.

11. The method of claim 10 and further including the steps of adding said intermediate checksum values to obtain a preliminary Internet Protocol Suite checksum; and adding all message data which is contained within said selected one of the packets of message data and which was not fetched in said fetching step to said preliminary Internet Protocol Suite checksum to generate the Internet Protocol Suite checksum.

12. The method of claim 9 wherein the computer system includes an arithmetic data register for performing said checksum generation macroinstruction, and wherein said arithmetic data register is capable of storing said second predetermined number of binary digits.

13. In a computer system for sending message data to and receiving message data from at least one communications network utilizing a Transmission Control Protocol/Internet Protocol (TCPPIP), the computer system having a memory, the message data being a plurality of words, each word having four 8-bit octets and two words being a double-word, a method of generating an Internet Protocol Suite checksum comprising the steps of:

(a) fetching a number of octets in the message data to be checksummed;

(b) converting said number of octets into a number of words having all octets used to store portions of the message data;

(c) adding octets of a first word of the message data together to form a checksum when said number of words is odd;

(d) executing a checksum generation macroinstruction to add octets of all double-words of the message data to said checksum when said number of words is greater than or equal to two;

(e) adding octets of a last word of the message data to said checksum when a number of octets modulo four is non-zero;

(f) adding a least significant two octet pairs of said checksum to a most significant two octet pairs of said checksum to form an interim checksum: and (g) adding a least significant two octets of said interim checksum to a most significant two otters of said interim checksum to form an Internet Protocol Suite checksum.

14. The method of claim 13 wherein said adding steps (c), (e), (f) and (g) use one's complement arithmetic.

15. In a native one's complement computer system for sending message data to and receiving message data from at least one communications network utilizing a Transmission Control Protocol/Internet Protocol (TCP/IP), the computer system having a memory and an instruction set including a checksum generation macroinstruction, the message data being a plurality of words, each word having four nine-bit octets and two words being a double-word, each nine-bit octet having eight used bits for storing message data and having one bit unused, a computer-implemented method of generating an Internet Protocol Suite checksum for the message data for use by TCP/IP applications, comprising the steps of:

(a) fetching a number of otters in the message data to be checksummed;

(b) converting said number of otters into a number of words having all octets used to store portions of the message data;

(c) adding, using one's complement arithmetic, the eight used bits of the octets of a first word of the message data together to form a checksum when said number of words is odd:

(d) executing a checksum generation macroinstruction to add the eight used bits of the octets of all double-words of the message data to said checksum when said number of words is greater than or equal to two;

(e) adding, using one's complement arithmetic, the eight used bits of the octets of a last word of the message data to said checksum when a number of octets modulo four is non-zero;

(f) adding, using one's complement arithmetic, the eight used bits of each of two least significant octet pairs of said checksum to the eight used bits of each of two most significant octet pairs of said checksum to form an interim checksum; and (g) adding, using one's complement arithmetic, the eight used bits of each of two least significant octets of said interim checksum to the eight used bits of each of two most significant octets of said interim checksum to form an Internet Protocol Suite checksum.

16. In a computer system for sending message data to and receiving message data from at least one communications network utilizing a Transmission Control Protocol/Internet Protocol (TCP/IP), the computer system having a memory, a method of generating an Internet Protocol Suite checksum comprising the steps of:

(a) fetching a checksum generation macroinstruction from the memory:

(b) decoding said checksum generation macroinstruction to determine where the message data resides in the memory:

(c) fetching the size of the message data to be checksummed to form the Internet Protocol Suite checksum; and (d) executing said checksum generation macroinstruction to generate the Internet Protocol Suite checksum for the message data, wherein said executing step includes the following steps:

(d1) fetching a selected register's contents for use as a first operand;

(d2) calculating an address in the memory wherein the message data to be checksummed resides:

(d3) fetching a double-word of message data from the memory for use as a second operand, said double-word including eight 8-bit octets;

(d4) adding said second operand to said first operand to form a checksum and storing said checksum as said first operand;

(d5) repeating steps (d3) through (d4) for all double-words of message data to be checksummed; and (d6) storing said checksum into said selected register.

17. The method of claim 16, wherein said adding step uses one's complement arithmetic.

18. The method of claim 16, wherein said double-word of message data includes eight 9-bit octets with one bit of each one of said eight 9-bit octets being unused.

19. The method of claim 16, further including the step:

(e) adding octets of the message data to be checksummed not previously processed as part of said double-words of message data to said checksum to form a new checksum and storing said new checksum in said register.

20. The method of claim 19, further including the step of (f) adding a least significant 32 bits of said register to a most significant 32 bits of said register to form a 32-bit interim checksum.

21. The method of claim 20, further including the step of (g) adding a least significant 16 bits of said interim checksum to a most significant 16 bits of said interim checksum to form a 16-bit Internet Protocol Suite checksum.

* * * * *